Oct. 29, 1940.  C. W. DOAN ET AL  2,219,981
MINNOW TRAP
Filed July 20, 1939
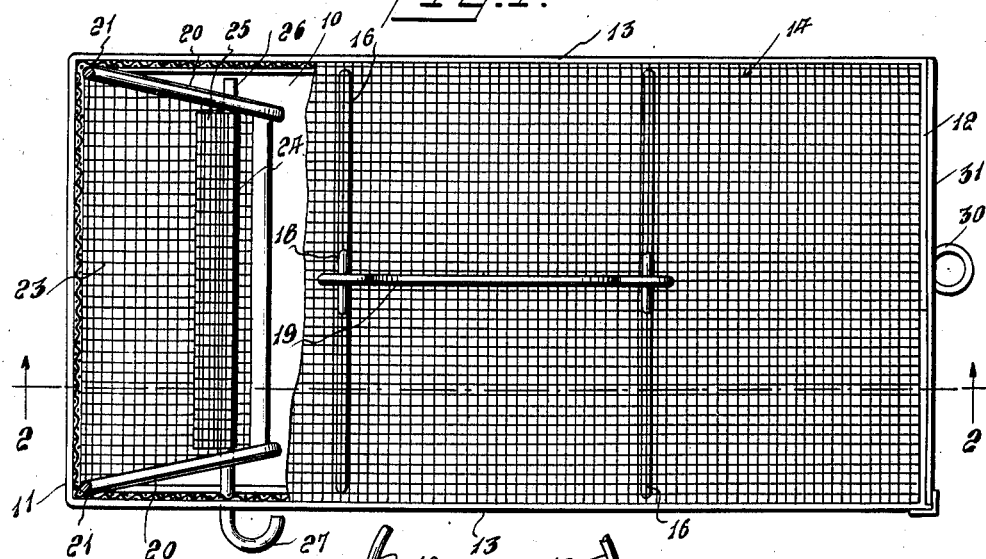
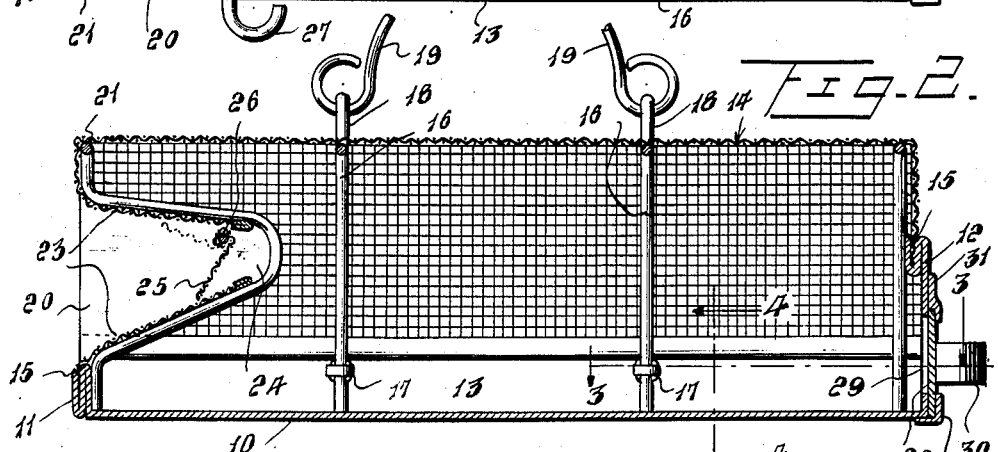
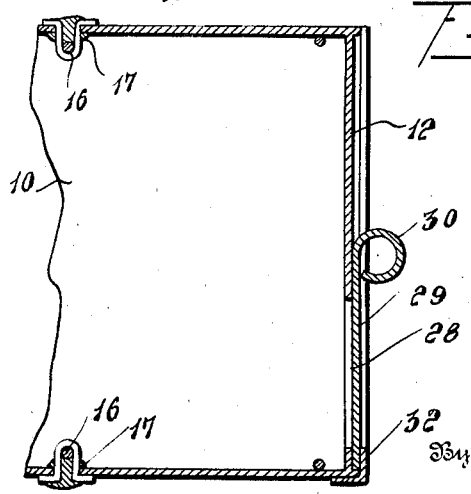
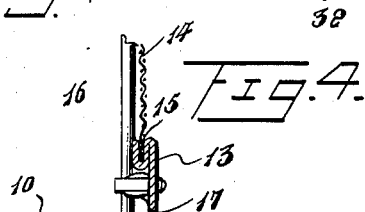
Inventors
C. W. Doan
L. L. Haggard
By
Attorney Patented Oct. 29, 1940

2,219,981

UNITED STATES PATENT OFFICE 2,219,981

MINNOW TRAP

Charles W. Doan and Logan L. Haggard, Miami, Okla.

Application July 20, 1939, Serial No. 285,609

3 Claims. (Cl. 43—65)

This invention relates to a minnow trap.

It is aimed to provide a novel construction of trap which may be located in a body of water, said trap containing food in a manner enabling escape of some of the same so that minnows will follow it to the source within the trap; a construction wherein the food will be circulated to some extent by the current of the water to cause some of it to escape from the trap, a construction which may be used for storage purposes and will exclude small water snakes in particular, and a construction which is durable, efficient and enables the hand to be placed within the trap, and manufacture and sale at minimum cost.

Various additional objects and advantages will become apparent from a consideration of the description following taken in connection with accompanying drawing illustrating an operative embodiment.

In said drawing:

Figure 1 is a plan view of the trap;

Figure 2 is a longitudinal sectional view taken on the plane of line 2—2 of Figure 1;

Figure 3 is a horizontal sectional view taken on the plane of line 3—3 of Figure 2, and Figure 4 is a vertical section taken on the plane of line 4—4 of Figure 3.

Referring specifically to the drawing wherein like reference characters designate like or similar parts, the trap may be made in any suitable size and it has a base 10 of suitable sheet metal, formed into a pan since it has connected end walls 11 and 12 and side walls 13.

Over the pan 10 is a cover section 14 made of open mesh metallic wire material or any other perforated material desired, such pan 10 and cover 14 being collectively substantially of rectangular shape. Along the lower marginal edge, the cover 14 which specifically may be of the material known as "hardware cloth," is lock-crimped and spot welded as at 15 to the upper portions of the walls 11, 12 and 13. Such cover may be reinforced by U-shaped frames 16 welded as at 17 to the walls 13. Such frames 16 have loops 18 extending above the cover 14 to which a handle or bail 19 is pivotally and foldably connected.

Suitable bait is adapted to be placed within the trap while in a stream or body of water at a suitable depth, with the wall 12 at the rear or upstream and with the wall 11 at the front or downstream. No limitation is to be implied with respect to the bait used within the trap but we find that cracker crumbs, cooked cornmeal with flour added, crumbled old biscuits, stale rye or whole wheat or even white bread, are excellent.

The wall 12 at the rear or upstream end, extends above the walls 13 in order to cause a circulation of the water and the food within the trap, so that some of the food will escape from the trap through the cover 14 and minnow aperture which will hereinafter be described, enticing minnows downstream to follow the same to the source in the trap. The scent of the bait also will escape from the trap in view of the open nature of the cover 14.

At the front or downstream end, a pair of inwardly diverging plates of perforate or imperforate material as preferred, designated 20 are fastened as at 21 to the corners of the cover 14 being marginally reinforced by generally U-shaped wires 14a extending from top to bottom and abutting the inner face of wall 11. Open mesh fabric material 23 similar to that at 14, is extended inwardly and connected to the upper and lower edges of such plates 20 and are parts of or connected to the cover 14. Such portions 23 provide a throat or space at 24 through which the minnows may enter the trap, attracted by the odor and sight of the bait therein. Such throat 24 may be closed at desired times, especially for storage purposes, within a stream without loss of entrapped minnows, and also to exclude prey such as small snakes. To this end, a closure member 25, the same material as cover 14, is carried by a rod 26, pivotally mounted in the plates 20 and having a manipulating handle 27, extended outwardly beyond one side of the cover. The fit of the rod 26 in the plates 20 is such that it has a limited sliding movement to enable the handle 27 to be engaged and disengaged in meshes of the cover to hold the closure 25 in open or closed position. Also, the rod 26 may fit with sufficient friction in the plates 20 as to maintain the closure 25 in any position to which it is moved.

In order that the trapped minnows may be effectively removed, the wall or plate 12 has a discharge opening 28 therethrough which is normally closed by a slidable cover plate 29 having a manipulating handle at 30. Such plate is slidably mounted in grooves, at top and bottom, afforded by strips 31 and 32 welded or otherwise fastened to the wall 12 and base 10. Attention is called to the fact that the opening 28 is preferably of a size to enable the insertion of a man's hand and arm for the purpose of straightening the trap should it be accidentally crushed. This opening 28 also provides means for readily removing large numbers of entrapped minnows which are dumped or poured through opening 28 into a bucket or other receptacle.

The throat 24 may vary in length and width but is preferably of a length equivalent to approximately two-thirds the width of the trap, and of approximately one-half of an inch in width. The throat 24 is thus made of sufficient size to enable large numbers of minnows, which normally run in schools, to enter the trap simultaneously, thus enabling entrapment of a greater number of minnows than where only a small entrance opening is provided. The size or throat 24 also permits catching of large fish, such as large flat shiners, by placing the trap on its side.

By providing the outlet opening 28 of sufficient size to receive a man's arm and hand, enables the trap to be used by fishermen as a live box.

The trap is preferably located along riffles and bars in about ten inches or a foot of water where there is a current, but where the water is not too swift, so that the trap will just be covered.

Various changes may be resorted to provided they fall within the spirit and scope of the invention.

We claim as our invention:

1. A minnow trap of the class described comprising a pan, a cover of open mesh material thereon, said trap having an entrance for minnows, means adjacent the rear of the trap extending above the pan so as to cause circulation of water and bait within the pan to discharge a portion of the bait through the open mesh cover into the water for the purpose specified, a pair of frames within the trap in longitudinally spaced relation, said frames being generally of U-shape having their terminals fastened to the side walls of the pan and being in intimate contact with the sides and top of the cover, and a bail exteriorly secured to said frames.

2. A minnow trap of the class described comprising a pan, and a cover of open mesh material thereon, inwardly diverging plates disposed at corners of the cover, inwardly extending strips of open mesh material secured to the upper and lower edges of said plates, the inner edges of said strips being disposed in spaced apart relationship to form with said plates an entrance for minnows, means adjacent the rear of the trap extending above the pan so as to cause circulation of water and bait within the pan to discharge a portion of the bait through the open mesh cover into the water for the purpose specified, the cover having an opening therein for discharge of minnows, and closure means for said opening.

3. A minnow trap of the class described comprising a pan, and a cover of open mesh material thereon, inwardly diverging plates disposed at corners of the cover, inwardly extending strips of mesh material secured to the upper and lower edges of said plates, the inner edges of said strips being disposed in spaced apart relationship to each other to provide, in combination with the plates, a minnow entrance, a rod pivotally and slidably mounted by said plates, a closure carried by the rod, said rod having a portion engageable in adjacent meshes of the cover to hold the closure in adjusted positions, means adjacent the rear of the trap extending above the pan so as to cause circulation of water and bait within the pan to discharge a portion of the bait through the open mesh cover into the water for the purpose specified, the cover having an opening therein for discharge of minnows, and closure means for said opening.

CHARLES W. DOAN.
LOGAN L. HAGGARD.